United States Patent [19]

Unruh et al.

[11] 4,019,603

[45] Apr. 26, 1977

[54] UNDERSTEER VEHICLE STEERING SYSTEM

[75] Inventors: Dale H. Unruh, Peoria, Ill.; Jan B. Yates, Reynoldsburg, Ohio

[73] Assignee: Caterpillar Tractor Co., Peoria, Ill.

[22] Filed: Dec. 24, 1975

[21] Appl. No.: 644,369

[52] U.S. Cl. .............................................. 180/134
[51] Int. Cl.² ........................................ B62D 5/06
[58] Field of Search ......... 180/134, 135, 136, 137, 180/138, 139, 79.1, 51, 468; 60/384; 91/420; 137/38

[56] References Cited

UNITED STATES PATENTS

| | | | |
|---|---|---|---|
| 2,896,734 | 7/1959 | Toth | 180/139 |
| 2,902,104 | 9/1959 | Schilling | 180/141 |
| 3,130,806 | 4/1964 | Baer | 180/51 |
| 3,249,173 | 5/1966 | Gordon | 60/384 X |
| 3,260,325 | 7/1966 | Brown | 91/420 |
| 3,338,328 | 8/1967 | Cataldo | 180/79.1 |
| 3,380,547 | 4/1968 | Granryd | 180/135 |
| 3,900,042 | 8/1975 | Unruh | 137/38 |

*Primary Examiner*—Joseph F. Peters, Jr.
*Assistant Examiner*—R. Schrecengost
*Attorney, Agent, or Firm*—Phillips, Moore, Weissenberger Lempio & Majestic

[57] ABSTRACT

A system for producing understeer characteristics in an articulated earthmoving vehicle. A fluidic accelerometer continuously senses lateral acceleration of the vehicle to modify the operator's input signal, causing hydraulic jacks to articulate the vehicle in such a manner as to exhibit an understeer steering characteristic. The accelerometer is mounted at or near to the roll axis of the vehicle to minimize the effects of vehicle roll dynamics upon the signal communicated to the steering control system and hydraulic jacks. The accelerometer and hydraulic jack control assemblage is utilized to create understeer characteristics in both follow-up and non-follow-up type steering systems.

10 Claims, 2 Drawing Figures

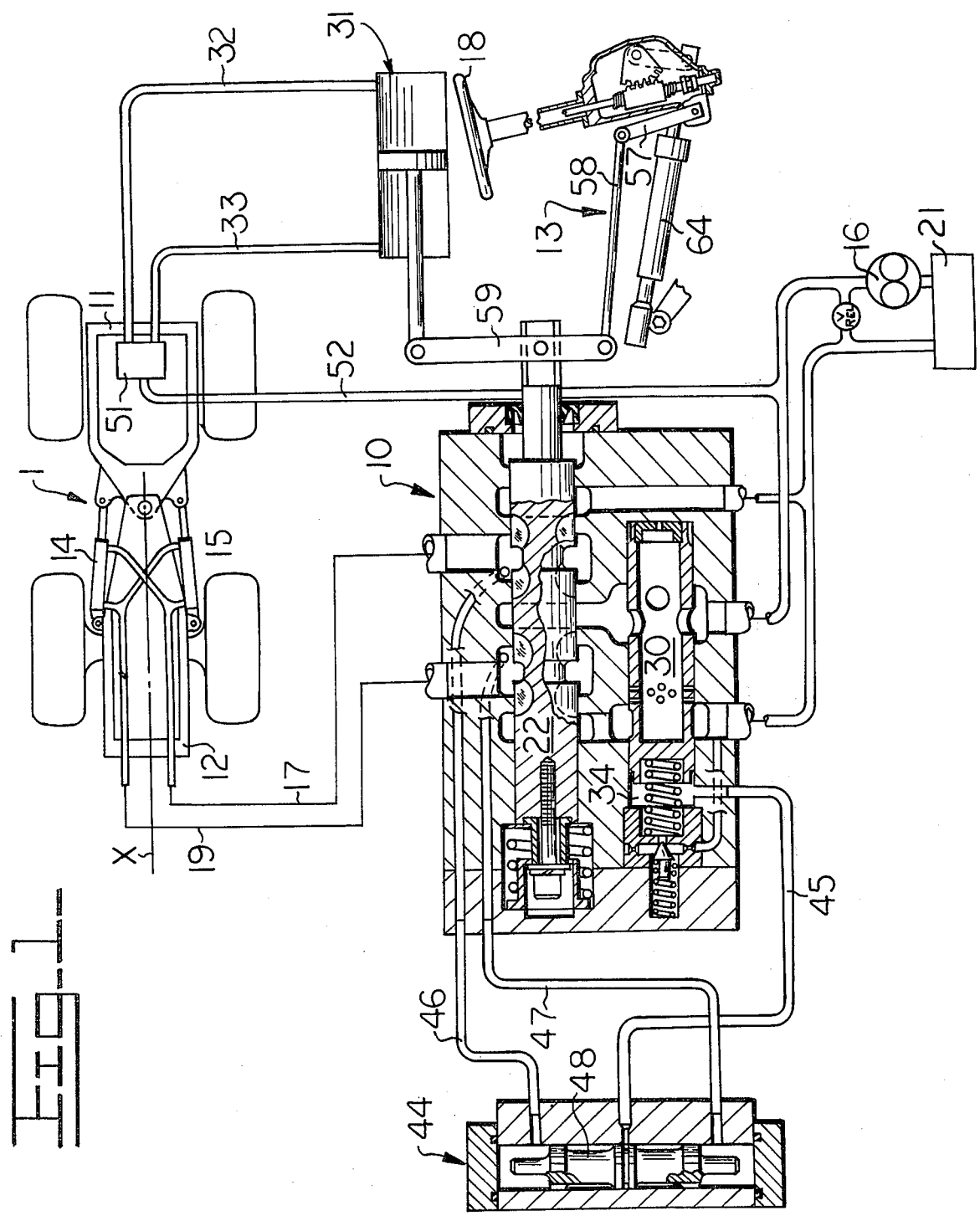

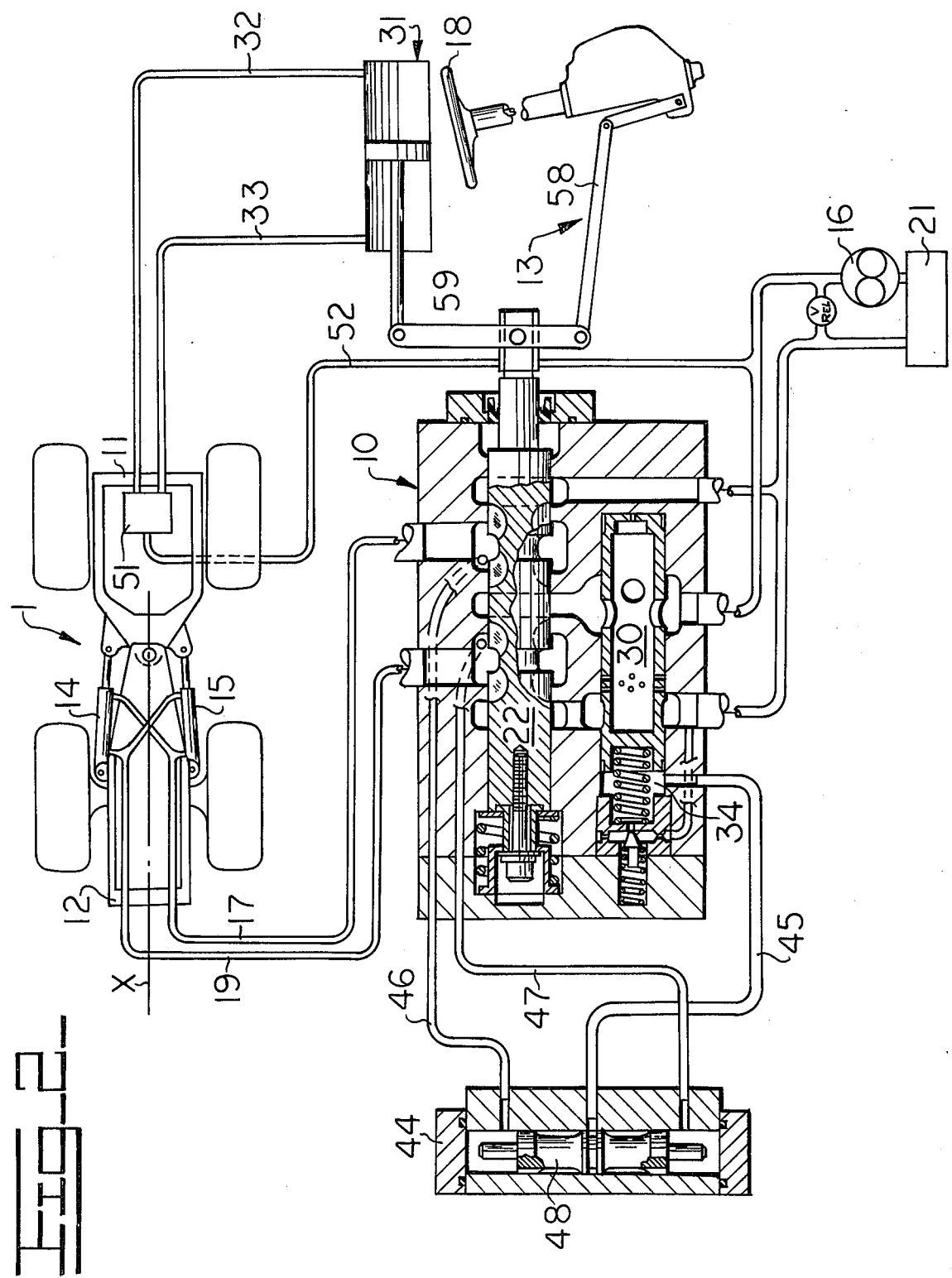

UNDERSTEER VEHICLE STEERING SYSTEM

BACKGROUND OF THE INVENTION

This invention relates to a system for producing understeer characteristics in an articulated vehicle which normally has a neutral steer characteristic. Road vehicles, such as automobiles, are usually designed with understeer characteristics to obtain desirable high speed handling. As opposed to vehicles with understeer, vehicles having oversteer characteristics will normally tend to break-away at the rear wheels in a turn at their adhesion limit before a loss of adhesion occurs in the front wheels. It is advantageous, therefore, to design in a given amount of understeer. Understeer characteristics are usually built into such vehicles by means of appropriate suspension geometry design. However, because many off-road vehicles, such as articulated loaders utilized in the earthmoving industry, have no suspension system, there has traditional been no convenient way to improve high speed handling by synthesizing understeer characteristics.

The need for improving on the usal neutral steer propensity in such vehicles is demonstrated when such vehicles are driven at relatively high speed over relatively smooth surfaces from job site to job site. Whereas at moderate speeds the vehicles are easily controlled and adequately safe, if higher speeds were safely attainable, the vehicle would be more valuable in that it could move from job site to job site in less time.

There have been prior art attempts to address this problem. Examples of such attempts are found in U.S. Pat. Nos. 3,338,328 to Cataldo, which teaches the sensing of vehicle wheel speed and wheel turning angle; 3,380,547 to Granry; and 3,249,173 to Gordon.

None of such prior art patents, however, teaches the utilization of lateral acceleration as the sole input signal to a control means for producing understeer in a vehicle and none teaches the particular location of an acceleration sensing device in the vehicle so as to minimize the effects of roll or inclination in the vehicle. The prior art also fails to provide a system for producing understeer in an articulated vehicle regardless of whether such vehicle is equipped with follow-up or non-follow-up type steering.

The present invention provides these features and also produces a steering system which, at high speeds, appears to the operator to be of the follow-up type but which, at low speeds, exhibits non-follow-up characteristics. The transition between the two modes of operation is smooth and practically unnoticeable to the operator.

SUMMARY AND OBJECTS OF THE INVENTION

This invention relates to a steering system which produces understeer characteristics in a vehicle not equipped with a suspension system, such as an articulated loader vehicle. It should be noted, however, that the system can also be utilized in a suspended vehicle, if appropriately modified.

The system includes a fluidic accelerometer and a compensating jack for directly sensing lateral acceleration in the vehicle during roading or during a turn maneuver and for automatically controlling the wheel steer angle in response to such signal. The accelerometer is regulatable so that any given amount of understeer may be selected and applied in the vehicle. Because of this selective adjustability feature, the system provides good maneuverability at both low and high speeds without a sacrifice in vehicle handling characteristics. At high speeds, the system effectively synthesizes the handling characteristics of an extended wheelbase vehicle.

It is an object of this invention to provide a steering system for an articulated vehicle which produces understeer characteristics in such vehicles.

It is another object of this invention to provide a steering system for an articulated vehicle which includes a fluidic accelerometer which sense lateral acceleration of the vehicle when roading or when in a turn maneuver and produces a signal which automatically controls the steer angle of the vehicle to build in understeer throughout the entire range of vehicle speeds.

A further object of the present invention is to provide a steering system for an articulated vehicle which includes a fluidic accelerometer located at or very near to the roll axis of the vehicle to prevent the accelerometer from sensing acceleration due to the roll dynamics of such vehicle.

Other objects and advantages of the present invention will become apparent from the following description and drawings.

BRIEF DESCRIPTION OF THE DRAWINGS

FIG. 1 shows schematically the instant steering system applied to an articulated vehicle having a follow-up steering mode; and FIG. 2 is a schematic representation of the instant steering system applied to an articulated vehicle utilizing the non-follow-up steering mode.

DETAILED DESCRIPTION

Referring to FIG. 1 of the drawings, the instant invention, as applied to an articulated vehicle utilizing a follow-up steering mode, may be appreciated. In a follow-up steering system, the vehicle wheels respond in proportion to the turning of the operator's steering wheel. In such a system, when the steering wheel is held motionless, turning of the vehicle wheels ceases. In FIG. 1, the articulated vehicle is shown generally at 1. Such vehicle includes frames 11 and 12 pivotally connected for steerable movement with respect to one another. Fluid motor means, in the form of a pair of hydraulic jacks 14, 15, are provided between the frames in a conventional manner so that extension of one jack and simultaneous retraction of the other will steer the vehicle in a desired direction.

If it is desired to steer the vehicle by moving frame 11 in a counter-clockwise direction about its pivot connection, fluid under pressure would be simultaneously admitted through a conduit 17 to extend the hydraulic jack 15 while fluid would be drained from the conduit 19 and jack 14 to cause the retraction thereof. Fluid pressure for the operation of the jacks is supplied by a pump 16 and communication of said fluid under pressure with the conduits 17 and 19 is controlled by a steering valve, shown generally at 10.

The steering valve 10 comprises a valve body having a main spool 22 reciprocally mounted for axial movement therein and adapted to communicate fluid from the pump 16 to either of the conduits 17 or 19. The steering valve includes a dump spool or piston 30 for bypassing excess fluid back to a supply reservoir 21 under certain specified conditions.

A shuttle valve means, shown generally at 44, is arranged to communicate either of the valve outlet ports for the conduits 17 and 19 with a conduit 45 and chamber 34 by means of a pair of conduits 46 and 47. The shuttle valve includes a spool 48 reciprocally mounted within a housing.

In operation, when the spool 22 is moved leftwardly, as shown in FIG. 1, pressurized fluid is communicated to the conduit 17 and is thereafter directed to conduit 46, and then to the shuttle valve 44. Such pressurized fluid functions to move the spool 48 downwardly to communicate conduit 46 and conduit 45 while simultaneously blocking conduit 47. Movement of the spool 22 rightwardly produces the reverse of the just described operations.

Thus far, the vehicle steering system including the steering jacks 14, 15, the steering valve 10, and the shuttle valve 44 are conventional and are disclosed with particularity in U.S. Pat. No. 3,260,325 to Brown et al., of common assignment herewith. Reference may be had to such patent for further details of such structure and the functions thereof.

The spool 22 is moved leftwardly or rightwardly by means of an operator controlled steering mechanism including a wheel or the like 18 and suitable connecting linkage 13. Such steering linkage 13, up to its point of connection with the spool 22, is conventional and is taught with particularity by U.S. Pat. No. 3,130,806 to Baer et al., of common assignment herewith. Such linkage provides a follow-up type steering mode and will be described herein only briefly to facilitate an understanding of the present invention.

The wheel 18 is supported on a rotatable spindle which is connected by suitable spline or other extensible means to a steering column rotatable within a housing which is carried by a portion of the vehicle. A threaded portion of the steering column extends through an interiorly threaded nut which has, adjacent its lower end, a grooved collar. Turning movements of the steering wheel 18 advance the steering column in one direction or the other through the threaded nut. A lever arm is pivoted on a portion of the housing connected with the collar so that reciprocable movement of the steering column causes a lever 57 to rock. The lever 57 is connected by means of a link 58 to a secondary lever 59 and to a portion of the spool 22. The linkage also includes means 64 (connected on one end to vehicle frame 11 and on the other end to vehicle frame 12) for preventing continuous steering of the vehicle wheels upon a slight turning of the steering wheel 18. The link 64, the details of which are specified in U.S. Pat. No. 3,130,806, functions to return the steering column and the control valve 22 to its normal position upon the cessation of a turning movement of the steering wheel. Absent such means, a small turn of the wheel 18 would position the spool 22 so as to allow fluid flow to the jacks 14 and 15 to articulate the vehicle and such articulation would continue until the valve spool 22 was manually repositioned. Thus, without the means 64 the system would operate in a non-follow-up mode.

As thus far described, the individual components of the steering system for the articulated vehicle 1 are individually known to the art. The instant invention, however, engrosses the addition to such known components of a fluidic accelerometer 51, a compensating jack 31, and suitable connective conduit means 32, 33, 52 for providing fluid under pressure to operate the system.

As shown in FIG. 1, a fluidic accelerometer is disposed upon the vehicle 1 proximate one of the wheel axles and near the dynamic roll axis $x$ of the vehicle. The particular placement of the accelerometer 51 is critical as will be explained more fully hereinafter.

The fluidic accelerometer 51 is not, in itself, new to the art. Such a fluidic accelerometer is the subject of U.S. patent application Ser. No. 437,205, filed Jan. 20, 1974 by D.H. Unruh et al., now U.S. Pat. No. 3,900,042, of common assignment herewith.

Such fluidic accelerometer provides means for sensing acceleration in the articulated vehicle 1 and for controlling the fluid motor or compensating jack 31 in response to such acceleration. While of the details of the fluidic accelerometer may be had by reference to U.S. Pat. No. 3,900,042, the device essentially includes a nozzle which directs a jet of fluid across a gap in a direction transverse to the direction along which acceleration is to be sensed. Two receiver ports are included in the device and are positioned to receive and divide the fluid jet in the absence of a flow deflection. Upon acceleration of the device, however, inertial effects cause the issuing jet to be slightly deflected thereby changing the amount of flow received at one receiver port relative to the other to produce a fluidic signal. Such signal may be amplified and caused to actuate the compensating motor 31 accordingly. The device described in the aforementioned U.S. Pat. No. 3,900,042 also includes compensating means which eliminate signal error which might otherwise arise from tilting of the vehicle 1 while it travels over uneven terrain while turning or from changes in jet fluid viscosity.

Fluid for the signal jet of the accelerometer is provided by the pump means 16 through a conduit 52 to the accelerometer device 51. Conduit 52, by means of suitable internal circuitry, also provides pressure fluid for operation of the compensating jack 31, as is apparent from an inspection of FIG. 1. In operation, the jack 31, through the linkage 59, will counteract or modify the input signal from the operator to the steering wheel 18 as the accelerometer device 51 senses the lateral acceleration of the vehicle while roading or during a turning maneuver. The gain of this lateral acceleration feedback may be regulated by appropriate adjustment of the device 51. During roading of the vehicle 1, the operator will sense a significant understeer effect and at higher speeds will be unable to achieve as sharp a steering corrections as at lower speeds. This results in better vehicle handling.

The accelerometer 51 is advantageously positioned on the vehicle 1 so that several causes of lateral acceleration are exposed to the device. When the vehicle 1 steers, the accelerometer could possibly sense the acceleration due directly to the articulation motion of the vehicle even at zero speed, the acceleration due to cornering at speed, and/or the acceleration due to any roll which might occur in the vehicle. By proper placement of the accelerometer in the vehicle, it can be made to sense effectively only the desired acceleration. To generate only understeer, this is achieved by locating the accelerometer as closely as possible to an axle of the vehicle and to the dynamic roll axis $x$ of such vehicle. It has also been found that by moving the accelerometer 51 forwardly or rearwardly along the dynamic roll axis, as shown in FIG. 1, it is possible to change the steering dynamics of the vehicle to make it more stable, or more or less responsive to whatever conditions are encountered.

By reference to FIG. 2, the utilization of the instant accelerometer and compensating system, as utilized in a non-follow-up steering system, may be readily appreciated. The system of FIG. 2 is similar to that shown in FIG. 1 and like reference numerals are utilized to indicate like parts. As will be readily noted, the invention as shown in FIG. 2 is the same as that shown in FIG. 1 with the exception of the linkage between the steering wheel 18 and the valve spool 22. In the FIG. 2 embodiment, there is a direct connection between the link 59 and the steering column and there is no follow-up means comparable to the means 64 in FIG. 1 for returning the spool 22 to its neutral position upon completion of a turn of the wheel 18. In operation, the accelerometer device 51 and its responsive compensating motor 31 operate in the previously described manner to modify the response of the valve spool 22 to operator inputs at the steering wheel 18.

By eliminating the follow-up link 64 between the front and rear portions of the vehicle, the lateral acceleration feedback from the accelerometer 51 acts as a substitute follow-up means. At high speeds, it provides a significant signal which, when transmitted to the steering valve via the jack 31, synthesizes mechanical feedback and produces an apparent follow-up steering system. At low speed operations, the acceleration feedback signal is negligible, resulting in a direct linkage from the operator wheel to the steering valve which is typical of a non-follow-up system.

It will be appreciated that the instant system provides a relatively simple steering mechanism which achieves results formerly effectively possible only through complex multicomponent assemblages. The present invention allows close control of the turning rate in articulated earthmoving vehicles and permits normal low speed operation of said vehicles unfettered by the steering control system. However, when the same vehicles are operated at high speeds during roading, they are automatically caused to exhibit understeer characteristics giving higher top speed capability at a high level of safety.

While the invention has been described with particular reference to the preferred embodiments, it should be apparent that variations and modifications are possible within the purview of the inventive concepts. No limitations with respect to these variations or modifications are intended except those implicit in the scope of the appended claims.

What is claimed is:

1. In an articulated wheeled vehicle having an operator actuated steering system a steering control assembly for producing an understeer steering characteristic in said vehicle, said control assembly comprising; accelerometer means mounted on said vehicle proximate an axle and the dynamic roll axis thereof for sensing lateral acceleration of said vehicle and for producing a signal in proportion thereto, compensating actuator means for automatically modifying the operator actuated steering of said vehicle solely in response to a signal from said accelerometer means, communication means between said accelerometer means and said compensating actuator means for transmitting said signal to said compensating actuator means.

2. The invention of claim 1 wherein the operator actuated steering system is of the follow-up type.

3. The invention of claim 1 wherein the operator actuated steering system is of the non-follow-up type.

4. The invention of claim 1 wherein the accelerometer means include a fluidic accelerometer device utilizing a deflectable jet of fluid for response to and measurement of lateral acceleration.

5. The invention of claim 1 wherein said compensating actuator means include a fluid operated motor, and wherein a single source of fluid under presure supplies fluid for both said motor and for operating said accelerometer means.

6. The invention of claim 1 wherein said operator actuated steering system includes fluid jack means for acting directly upon said vehicle to steer said vehicle, said system further including a source of fluid under pressure for operating said fluid jack means, fluid communication means between said source and said fluid jack means, steering valve means disposed within said fluid communication means for controlling the flow of fluid to said jack means.

7. The invention of claim 6 further including an operator actuated steering mechanism connected with said steering valve means for transmitting movements of said mechanism directly to said steering valve means.

8. The invention of claim 7 including mechanical connection means between said compensating actuator means and said steering valve means for also directly transmitting movements of said compensating actuator means to said steering valve means to modify the condition of said steering valve means due to said movements of said operator acutated steering mechanism.

9. The invention of claim 8 wherein said compensating actuator means include a fluid operated motor having an output member connected through mechanical linkage means with said steering valve means.

10. The invention of claim 9 wherein said vehicle is an articulated earthmoving vehicle having first and second pivotably connected frame sections, and wherein said operator actuated steering system includes a pair of fluid operated jacks connected respectively between said frame sections for relatively positioning said frame sections in response to the transmission of fluid under pressure from said steering valve means.

* * * * *